(No Model.)
R. FLAHERTY.
BOLT OR RIVET.
No. 577,737. Patented Feb. 23, 1897.
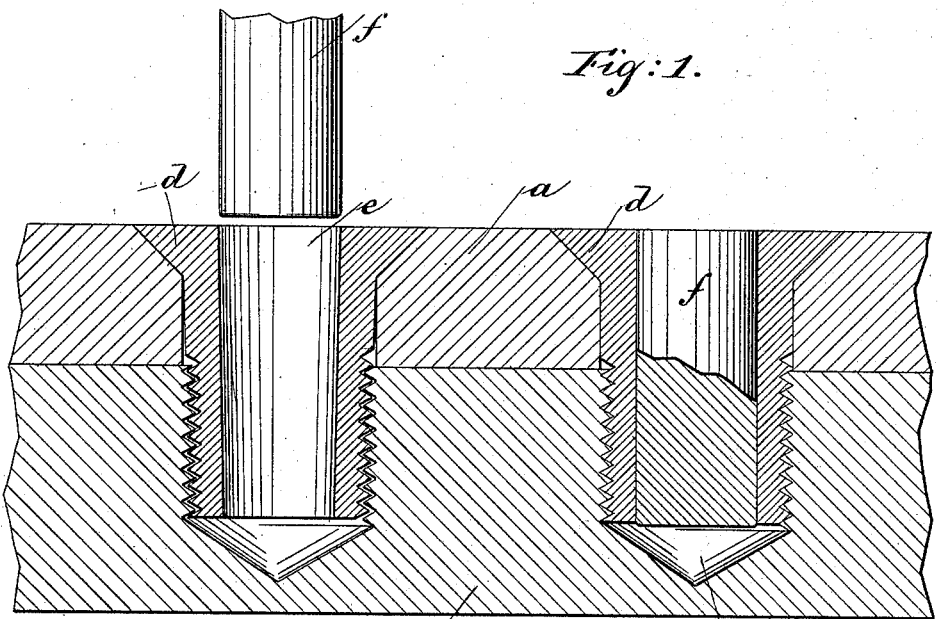
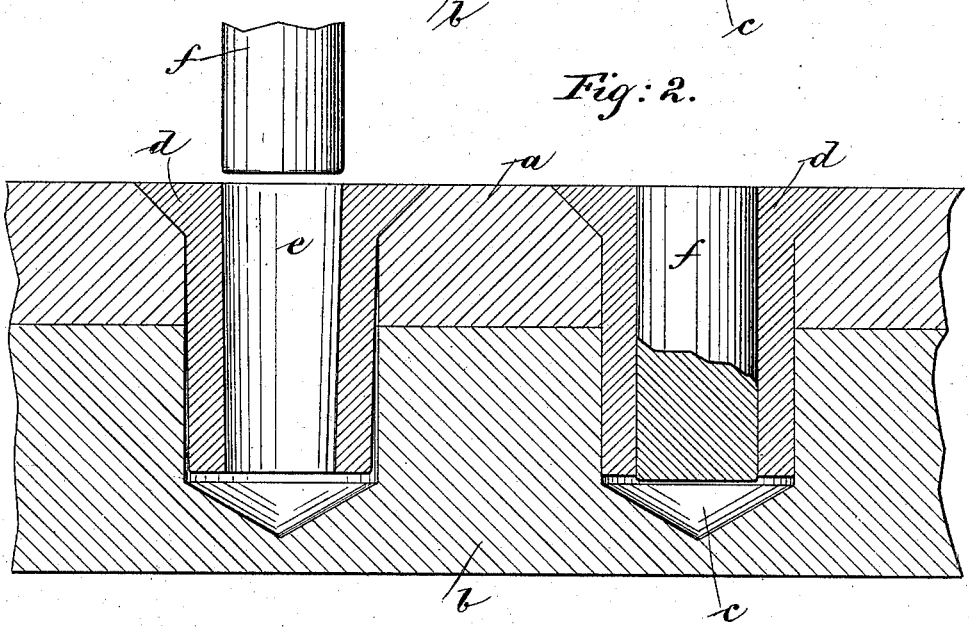
Witnesses
D. Petri-Palmedo
F. P. Wentworth
Robert Flaherty — Inventor
By his Attorneys
Beach & Frothingham.

UNITED STATES PATENT OFFICE.

ROBERT FLAHERTY, OF NEW YORK, N. Y.

BOLT OR RIVET.

SPECIFICATION forming part of Letters Patent No. 577,737, dated February 23, 1897.

Application filed November 7, 1896. Serial No. 611,311. (No model.)

*To all whom it may concern:*

Be it known that I, ROBERT FLAHERTY, a citizen of the United States, residing at New York, in the county and State of New York, have invented certain new and useful Improvements in Bolts or Rivets, of which the following is a specification, reference being had therein to the accompanying drawings.

My invention relates to that class of bolts or rivets which are especially designed for use in a connection of greater or less permanency and to assume such a stability and fixity of character in this relation as will render an arbitrary loosening or change of position impossible.

In the class of bolts and rivets above referred to it is necessary to construct each bolt in such manner and of such material as to be readily susceptible to expansion in order to secure the bolt firmly in the desired position. To accomplish this, many devices have heretofore been employed, including an ordinary V-shaped wedge driven into the head of the bolt, a hole drilled in one end of the bolt in connection with a beveled wedge, and a large number of devices applied between the outer periphery of the bolt and the cavity within which it is seated. In all these forms, however, it has been found that the means employed either proved ineffectual or else weakened the bolt structurally and generally so cracked it as to expose some unfinished portion of the bolt to the direct action of the elements, which lead to the speedy destruction of the bolt by rusting and the loss of that character of permanency and stability which it is particularly desired to retain. When the V-shaped wedge is employed, it is clear that the expansion will be only in directions corresponding with the tapered sides of the wedge employed, and the aforesaid cracking and consequent exposure are unavoidable. The same great fault exists in the devices applied to the outer periphery of the bolt, for it is obvious that the pressure will only be exerted directly at that point where the wedge is applied and that the entire bolt will be moved to a certain extent or else the purpose of the wedge is not fulfilled and a crack be left between the bolt and its bed.

Equally serious faults are to be found in that construction where a hole is drilled partially through the bolt longitudinally, for in a device of this class heretofore employed it was necessary that the bolt should be expanded to an equal degree throughout the full extent of the penetration of the wedge, and it is obvious that as the sides of the bolt were expanded that portion of them which was adjacent to the base of the drill-hole must necessarily tear away from the core at that point, thus materially impairing the strength of the bolt. Furthermore, no allowance was made whereby the bolt or rivet could be utilized in the relation as shown in the accompanying drawings, for it is clear that in no device heretofore known or employed has there been any means by which a bolt could be expanded otherwise than to an extent corresponding throughout the entire expanded portion to the greatest dimensions of the wedges employed.

The object of my invention is to obviate those difficulties above referred to by providing a bolt or rivet subject to expansion which may be expanded within a cavity without impairing the original strength of the bolt or so cracking and distorting it as to render it liable to destruction or removal by the action of the elements or any device or means applied to said cracks or to a space left exposed by reason of said distortion.

The hereinafter-described construction would admit of many uses for which all prior devices were unsuitable and incompetent, for it not only securely binds the unexposed portion of the bolt against the sides of the cavity, but preserves the original strength of the bolt and does not in any way effect an exposure of any portion thereof thereby impairing the bolt's strength and utility in any way.

My invention consists in the novel features of construction hereinafter set forth and described, and more particularly pointed out in the claims hereto appended.

Referring to the drawings, Figure 1 is a sectional view of two plates united by bolts or rivets, which are also shown in section and respectively with a cylindrical plug for expanding the bolt, and the bolt expanded thereby. Fig. 2 is a similar view showing a modification of the above-mentioned bolts and in the same relation.

Like letters refer to like parts throughout both views.

In the drawings, a and b denote two plates having holes drilled therein which are adapted to register and together form a seat c, suitable for receiving the bolt or rivet d.

The bolt or rivet d is made screw-threaded or not, at the option of the maker, and has a tapered cylindrical cavity extending the entire length of the bolt. This cavity may be tapered to any degree found to satisfy the purposes for which it is provided; but I find that a taper of one-eighth of an inch in a four-inch bolt proves very satisfactory in actual operation.

f is a cylindrical plug composed of some material having greater powers of resistance than that employed in the manufacture of the bolt proper and of dimensions throughout equal to and corresponding with the greatest diameter and depth of the tapered cavity e. It is essential that the diameter of the plug and that of said cavity at its mouth or widest part should correspond; but it is not absolutely necessary that the said cavity should taper directly from its mouth, as it is obvious that the cavity could be continued with its wall perfectly perpendicular for a short distance and thereafter taper for the remainder of the distance and not depart from the spirit of my invention.

The heretofore-described bolt or rivet is expanded in the following manner: The bolt or rivet proper having been placed in the proper relation to the objects to be united, the cylindrical plug is placed in the exposed opening of the tapered cavity e and gradually forced therein by a pressure sufficient to expand the sides of the bolt within the cavity. The bolt, being of a material having less powers of resistance than the plug, readily expands instead of compressing the plug. As the plug penetrates said cavity every portion of the bolt throughout the tapered portion is successively expanded, said expansion being equal and simultaneous at every point of the periphery of that part of the plug which comes in contact with the tapered walls of the cavity. The expansion will necessarily be correspondingly greater as the diameter of the cavity becomes smaller; but as the expansion is a graduated process there is no liability of cracking the bolt. The point of the cavity having the smallest diameter will be expanded to the greatest extent; but as there are no transverse fibers connecting the lower parts of the bolt there will be no tearing or cracking at that point, inasmuch as, as before stated, the expansion is gradual. The head of the bolt or rivet will not be expanded in the slightest degree so far as the exposed surface is concerned, so that no unfinished or distorted surface will be exposed to the action of the elements or any destroying means applied at this point.

The bolt is shown in the drawings as utilized in the art of burglar-proof-safe construction, for which purpose it is particularly adapted, although it is obvious that it is applicable to numerous other uses. In the art of burglar-proof-safe construction it is desirable to have all bolts, rivets, &c., so firmly secured in position as to be irresponsive to any great and sudden jar. Heretofore it has been found impossible to secure this result and it has been a common and successful expedient in burglarizing this class of safes to apply nitroglycerin or some other powerful explosive to some crack or cavity in some exposed portion of the safe, and, by exploding the same, so jar the entire structure as to loosen all the connecting bolts and rivets, after which the disintegration of the safe is easily accomplished.

By utilizing my improved bolt or rivet it is possible to so expand the same within the cavity in which it is seated as to practically render it and the plate or other matter having said cavity therein one homogeneous mass, which it is impossible to affect in any way, it being impossible for even water or any other liquid to find a passage between the rivet and the walls of its seat.

The modification shown in Fig. 2 is similar in all respects to the device shown in Fig. 1, excepting that the bolt is not screw-threaded, it being intended that the bolt should be held in position exclusively by the binding of the outer surface of the bolt and that of the cavity in which it is seated together.

It is not my intention to confine my invention to the particular form shown in the drawings, as it is obvious that so long as there is embodied in a structure a tapered cavity and a true straight plug of similar configuration my invention is not departed from.

What I claim as my invention, and desire to have protected by Letters Patent, is—

1. A flat-headed bolt or rivet provided with a cavity extending longitudinally therethrough, which is tapered or slightly conical throughout its length or a portion thereof, in combination with a cylindrical plug of substantially the same length as the said cavity and of a diameter to fit the same at the entrance thereof, whereby when driven or forced by gradual pressure into the said cavity the latter will be fully occupied, and the said bolt or rivet will be expanded throughout the whole extent of the tapered portion of the cavity, leaving the combined bolt and plug flush on the outer surface, substantially as specified.

2. A flat-headed bolt or rivet, screw-threaded on its exterior surface, provided with a cavity extending longitudinally therethrough, which is tapered or slightly conical throughout its length or a portion thereof, in combination with a cylindrical plug of substantially the same length as the said cavity and of a diameter to fit the same at the entrance thereof, whereby when driven or forced by gradual pressure into the said cavity the latter will be fully occupied, and the said bolt or rivet will be expanded throughout the whole extent of the tapered portion of the cavity, substantially as specified.

In witness whereof I have hereto affixed my signature, this 4th day of November, 1896, in the presence of two witnesses.

ROBERT FLAHERTY.

Witnesses:
 WALLACE SCOTT,
 JAMES H. WILLIAMS.